(No Model.)
A. FERNANDEZ.
PROCESS OF PRESERVING MILK.
No. 602,315.　　　　　　　　　Patented Apr. 12, 1898.
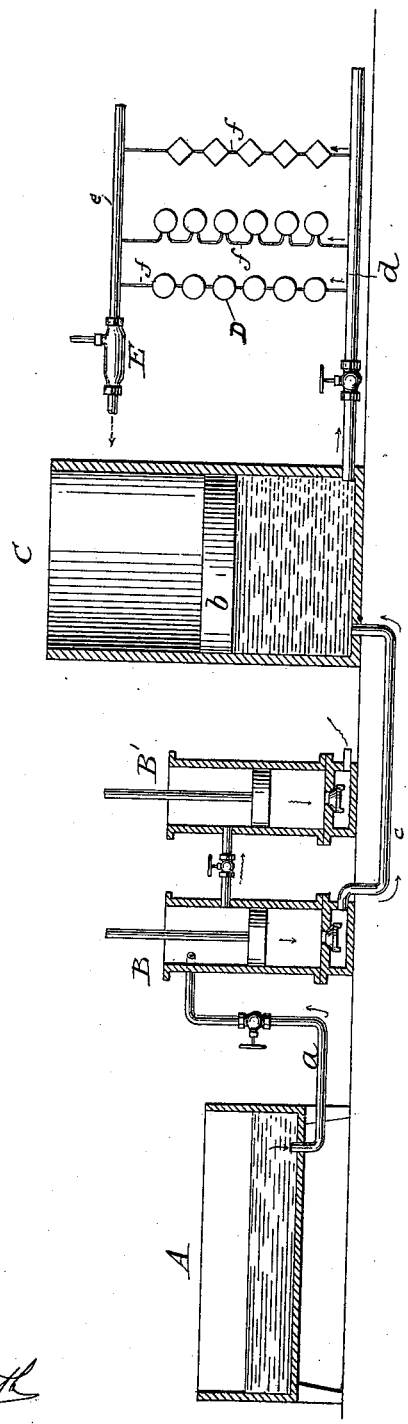
Witnesses
Sidney P. Hollingsworth
Neil R. Parkins.
Inventor:
Aurelio Fernandez
by ... Attorneys.

UNITED STATES PATENT OFFICE.

AURELIO FERNANDEZ, OF SANTIAGO, CHILE.

PROCESS OF PRESERVING MILK.

SPECIFICATION forming part of Letters Patent No. 602,315, dated April 12, 1898.

Application filed July 16, 1897. Serial No. 644,786. (No specimens.)

*To all whom it may concern:*

Be it known that I, AURELIO FERNANDEZ, a citizen of the Republic of Chile, residing at Santiago, Chile, have invented certain new and useful Improvements in Preserving Milk, of which the following is a specification.

My invention relates to a process for preserving milk indefinitely in its natural state without adding any substance whatsoever thereto by exhausting the gases contained therein and then canning and sterilizing it, which process can be carried on without changing any of its properties and without exposure to the air.

This invention is an improvement on that of Letters Patent granted to Enrique Taulis for a process of and apparatus for sterilizing milk, dated July 28, 1896, and numbered 564,851, which process I have simplified by doing away with the filtration of the milk through charcoal, the pasteurizer, the refrigerator, the introduction of steam into the cans before filling them, and the pumps which force the entrance of the milk into the cans, and I have added to it an air-exhauster or vacuum-machine, which, before the cans are filled with milk, extracts the air from them, making a vacuum, and draws the milk into the cans by the continued operation of the air-exhauster. In this manner I fill the cans with milk without its having come in contact with the air.

In carrying out my improved process the milk to be preserved is first poured into a receptacle of convenient size, from which it passes by a pipe to a suitable exhaust or vacuum apparatus, by means of which the air and gases contained in the milk are removed. The purified milk is then forced into a storing-tank ready for canning. For the purpose of properly packing in a convenient form the purified milk, so it may be readily handled, I unite by means of small pipes a series of cans of a convenient size, one end of each series being connected to a pipe running from the storage-tank, the other end of each of said series being joined to an air-exhauster of approved type. The pipe leading from the storage-tank to the cans is provided with a valve, which being closed the air is by means of the said air-exhauster exhausted from the cans, after which the milk is drawn under the influence of the vacuum from the storage-tank to the cans, filling every part of them. The connections between the cans are then hermetically closed and the cans separated, after which they are introduced into a suitable apparatus for heating and thereby sterilizing the purified milk.

The accompanying drawing shows an apparatus adapted to the carrying out of my improved process.

A is the primary milk-receptacle; B, the vacuum apparatus, connected to the receptacle A by a pipe *a*, and C the storage-tank, having an air-tight movable cover *b*, the tank being united to the vacuum apparatus B by a pipe *c*.

B' is a secondary vacuum apparatus which takes the gases extracted from the milk in B.

D represents series of cans connected to a pipe *d*, leading from the storage-tank, and to a pipe *e*, closed at one end and provided at the other with an air-exhauster or vacuum-pump E. The several cans of the series are joined by the tubes *f*, which, after the vacuum has been made in the cans and they have been filled, are closed, after which the cans are separated. The pipes are provided with suitable valves for manipulation during the several operations described.

Having thus described my invention, I claim—

The herein-described process of preserving milk which consists, first, in submitting milk at normal temperature to reduced pressure for the removal of all gases therefrom; then introducing the purified milk at normal temperature, solely by means of a vacuum and without exposure to the atmosphere, into a series of connected air-exhausted cans; then hermetically sealing each can of said series of filled cans; then separating the series into individual cans, and finally subjecting the milk within the said sealed and separated cans to sterilization by heat alone, substantially as set forth.

In testimony whereof I have hereunto set my hand, in the city of Baltimore and State of Maryland, this 15th day of July, 1897.

AURELIO FERNANDEZ.

Witnesses:
   A. V. GANA,
   HARRY W. RODGERS.